Patented Jan. 6, 1925.

1,521,611

UNITED STATES PATENT OFFICE.

EUGENE FITZPATRICK, OF NEW YORK, N. Y., ASSIGNOR TO NICHOLS COPPER COMPANY, OF NEW YORK, N. Y., A CORPORATION OF NEW YORK.

PROCESS FOR MANUFACTURING BASIC COPPER CARBONATE.

No Drawing.   Application filed February 19, 1923.   Serial No. 620,041.

*To all whom it may concern:*

Be it known that I, EUGENE FITZPATRICK, a citizen of the United States, residing at Woodhaven, Queens Borough, city and State of New York, have invented certain new and useful Improvements in Processes for Manufacturing Basic Copper Carbonate, of which the following is a specification.

My invention relates to a commercially practicable method of causing a reaction between sodium carbonate and copper sulfate to produce basic copper carbonate having mixed therewith no basic copper sulfate.

Basic copper carbonate has the formula $(CuCO_3)_2.Cu(OH)_2$. It is usually produced by adding sodium carbonate, either dry or in solution, to a solution of copper sulfate. The reaction which takes place between these substances when and in so far as it results in the formation of basic copper carbonate is as follows:

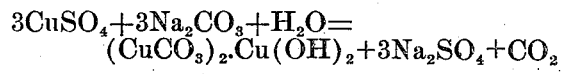

In practice, however, the above process produces, in addition to copper carbonate, a large proportion of basic copper sulfate, so large in fact that at times substantially the entire copper containing product consists of such sulfate. The proportions of such copper carbonate and such copper sulfate vary widely in succeeding batches, no two batches being of the same composition. So much of the reaction as results in the formation of the basic copper sulfate is as follows:

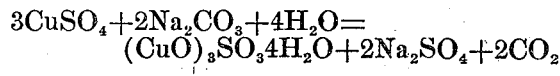

In view of the growing importance of basic copper carbonate for use in protecting seed wheat it is highly desirable to produce such carbonate free from admixture with a foreign substance.

I have found that the desired uniform product, basic copper carbonate, can be obtained without admixture of basic copper sulfate, by intimately mixing comminuted copper sulfate and sodium carbonate in dry form, and then adding the resulting mixture to water while vigorously agitating the latter, the rate of addition of the mixture being no greater than the rate of formation of the basic copper carbonate.

*Example.*

I grind 100 pounds of copper sulfate crystals until the material is sufficiently comminuted to pass through a hundred mesh sieve, and place this, together with 42 pounds of ground dry sodium carbonate (commercial soda ash) into a pebble mill; the mill is operated for about 15 minutes or until a thorough mixing of the two substances has taken place. The resulting mixture is fed in a stream into water at room temperature while such water is being vigorously agitated, for instance by stirring. The amount of water used should be sufficient to prevent the formation of a saturated solution of the sodium sulfate; I prefer to use an amount in weight at least five times that of the mixture to be added thereto. The stirrers are operated preferably at the rate of from 50 to 100 revolutions per minute. The rate of addition of the mixture, and the degree of agitation of the water, should be such that the basic copper carbonate is formed as rapidly as the ingredients are added. If the material is added at too great a rate of speed the ingredients will not dissolve and react immediately; the copper sulfate, which is the more readily soluble ingredient, will dissolve first and the later formed solution of sodium carbonate will then meet a solution of copper sulfate, thus producing a condition which I wish to avoid, namely the formation of basic copper sulfate just as in the prior art as hereinabove described.

After the completion of the operation, the precipitate is allowed to settle out, or is filtered out, and is washed several times until the sodium sulfate has been removed.

Of course, my improved method may be carelessly or inefficiently operated so as to result in the formation of some basic copper sulfate, but such use of my method would of course still be within the spirit of my invention.

I claim:

The method of producing basic copper carbonate which consists in intimately mixing comminuted dry copper sulfate and dry sodium carbonate, and adding the resulting mixture to water while vigorously agitating the latter, the rate of addition being no faster than the rate of formation of the carbonate, substantially as and for the purpose described.

In testimony whereof, I have hereunto set my hand.

EUGENE FITZPATRICK.